(12) United States Patent
Yoshimi et al.

(10) Patent No.: US 8,400,591 B2
(45) Date of Patent: Mar. 19, 2013

(54) VIDEO IMAGE EVALUATION EQUIPMENT

(75) Inventors: Hiroyuki Yoshimi, Ibaraki (JP); Kentarou Takeda, Ibaraki (JP); Hiroaki Sawada, Ibaraki (JP); Masaki Hayashi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 263 days.

(21) Appl. No.: 12/989,746

(22) PCT Filed: Apr. 16, 2009

(86) PCT No.: PCT/JP2009/057628
§ 371 (c)(1),
(2), (4) Date: Oct. 26, 2010

(87) PCT Pub. No.: WO2009/139260
PCT Pub. Date: Nov. 19, 2009

(65) Prior Publication Data
US 2011/0032437 A1 Feb. 10, 2011

(30) Foreign Application Priority Data

May 15, 2008 (JP) .................................. 2008-127821

(51) Int. Cl.
*G02F 1/1335* (2006.01)
(52) U.S. Cl. ...................... 349/113; 349/98; 349/117
(58) Field of Classification Search .......... 349/1, 96–98, 349/113, 117–119
See application file for complete search history.

(56) References Cited

U.S. PATENT DOCUMENTS

| 4,025,161 | A | 5/1977 | La Roche |
| 7,352,420 | B2 | 4/2008 | Maeda et al. |
| 7,911,565 | B2 * | 3/2011 | Zhong et al. ............... 349/98 |
| 2002/0054269 | A1 | 5/2002 | Maeda et al. |
| 2005/0151896 | A1 | 7/2005 | Hara et al. |
| 2008/0171858 | A1 | 7/2008 | Nagata et al. |
| 2009/0034070 | A1 | 2/2009 | Hara et al. |
| 2009/0201435 | A1 | 8/2009 | Yoshimi et al. |

FOREIGN PATENT DOCUMENTS

| JP | 50-081167 A | 7/1975 |
| JP | 6-273738 A | 9/1994 |
| JP | 2001-221995 A | 8/2001 |
| JP | 2004-029743 A | 1/2004 |
| JP | 2004-107542 A | 4/2004 |
| JP | 2004-109707 A | 4/2004 |
| JP | 2005-097240 A | 4/2005 |
| WO | 2007/138787 A1 | 12/2007 |

OTHER PUBLICATIONS

International Search Report of PCT/JP2009/057628, mailing date May 19, 2009.

\* cited by examiner

*Primary Examiner* — Dung T. Nguyen
(74) *Attorney, Agent, or Firm* — Westerman, Hattori, Daniels & Adrian, LLP

(57) ABSTRACT

A video image evaluation equipment of the present invention is capable of converting circularly-polarized light emitted from a circularly polarizing light source into linearly-polarized light so as to transmit an absorption-type linear polarizer by a wavelength plate to be incident on a liquid crystal panel. This makes it possible to enter and reflect light emitted from the circularly polarizing light source on the liquid crystal panel without loss, which leads to display brighter video images than conventional ones.

4 Claims, 6 Drawing Sheets

PRIOR ART

VIDEO IMAGE EVALUATION EQUIPMENT

BACKGROUND OF THE INVENTION

1. Field of the Invention

The present invention relates to a video image evaluation equipment which comprises a liquid crystal display and a circularly polarizing light source mounted outside the liquid crystal display.

2. Description of Related Art

Conventionally, liquid crystal displays respectively having a liquid crystal layer used as a display medium and a reflective layer such as a reflecting plate or a repeller located behind the liquid crystal layer (opposite side to the viewer-side) are known (Japanese Patent Laid-open Publication No. JP 06-273738 A, and Japanese Patent Laid-open Publication No. 2001-221995 A). FIG. 6 is a schematic view of such a conventional liquid crystal display. Out of natural light emitted from a light source 61, linearly-polarized light alone having transmitted an absorption-type linear polarizer 62 is incident on a liquid crystal panel 63. Light having transmitted a liquid crystal layer 64 in the liquid crystal panel 63 is reflected at a reflective layer 65. Subsequently, the light transmits the liquid crystal layer 64 again and then the absorption-type linear polarizer 62 to reach the viewer.

Such a liquid crystal display does not need a backlight in a bright environment and is superior in power saving property because the liquid crystal display performs a display by reflecting light emitted from an external light source (external light). In the aforementioned liquid crystal display, however, even when light emitted from the external light source is intense, most of the light is absorbed into an absorption-type linear polarizer, so that only part of light reaches a liquid crystal panel. This creates such problems that there is less reflected light and the display is dark. Accordingly, a need exists for a liquid crystal display which has solved such problems.

SUMMARY OF THE INVENTION

It is an object of the present invention to provide a video image evaluation equipment capable of displaying bright video images on a liquid crystal display.

The video image evaluation equipment according to the present invention is capable of converting circularly-polarized light emitted from a circularly polarizing light source into linearly-polarized light with a wavelength plate so as to transmit an absorption-type linear polarizer to be incident on a liquid crystal panel. This makes it possible to enter and reflect light emitted from the circularly polarizing light source on the liquid crystal panel without loss, which leads to display brighter video images than conventional ones.

In a first preferred embodiment, a video image evaluation equipment according to the present invention comprises: a liquid crystal display; and a circularly polarizing light source arranged outside the liquid crystal display, wherein the liquid crystal display comprises in order from the circularly polarizing light source-side: a wavelength plate having functions to convert circularly-polarized light into linearly-polarized light and vice versa; an absorption-type linear polarizer; and a liquid crystal panel, the liquid crystal panel comprises: a liquid crystal layer used as a display medium; and a reflective layer arranged on the opposite side to a viewer-side of the liquid crystal layer, the wavelength plate is so arranged that the linearly-polarized light may transmit the absorption-type linear polarizer.

In a second preferred embodiment of the video image evaluation equipment according to the present invention, the wavelength plate is a quarter wavelength plate.

In a third preferred embodiment of the video image evaluation equipment according to the present invention, an optical film having a helical structure is arranged on a lighting apparatus for emitting natural light or a window for passing natural light in the circularly polarizing light source.

In a fourth preferred embodiment of the video image evaluation equipment according to the present invention, the optical film having a helical structure is an optical film in which a liquid-crystalline compound exhibiting a cholesteric phase is solidified.

The video image evaluation equipment of the present invention is capable of displaying brighter video images than conventional ones.

DESCRIPTION OF THE SYMBOLS

10: video image evaluation equipment, 11: liquid crystal display, 12: circularly polarizing light source, 13: wavelength plate, 14: absorption-type linear polarizer, 15: liquid crystal panel, 16: liquid crystal layer, 17: reflective layer, 20: circularly polarizing light source, 21: window, 22: optical film, 31: circularly polarizing light source, 32: wavelength plate, 33: absorption-type linear polarizer, 34: liquid crystal panel, 41: circularly polarizing light source, 42: wavelength plate, 43: absorption-type linear polarizer, 44: liquid crystal panel, 50: video image evaluation equipment, 51: liquid crystal panel, 53: wavelength plate, 54: liquid crystal display, 55: circularly polarizing light source, 56: fluorescent lamp, 57: optical film, 61: light source, 62: absorption-type linear polarizer, 63: liquid crystal panel, 64: liquid crystal layer, 65: reflective layer

DESCRIPTION OF THE PREFERRED EMBODIMENTS

[Video Image Evaluation System]

Figure 1:
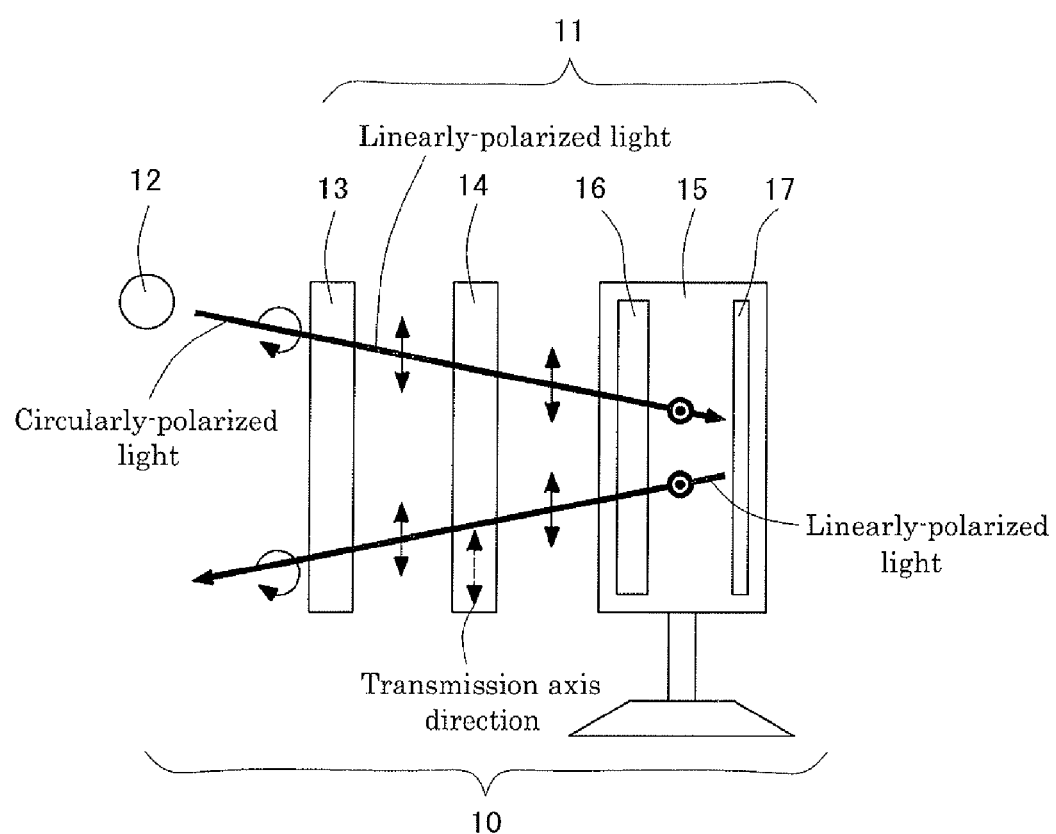
FIG. 1 is a schematic view of a video image evaluation equipment of the present invention.

FIG. 1 schematically shows one embodiment of a video image evaluation equipment according to the present invention. A video image evaluation equipment 10 of the present invention comprises: a liquid crystal display 11; and a circularly polarizing light source 12 arranged outside the liquid crystal display 11. The liquid crystal display 11 comprises in order from the circularly polarizing light source 12-side: a wavelength plate 13 having functions to convert circularly-polarized light into linearly-polarized light and vice versa; an absorption-type linear polarizer 14; and a liquid crystal panel 15. The liquid crystal panel 15 comprises: a liquid crystal layer 16 used as a display medium; and a reflective layer 17 arranged on the opposite side to the viewer-side of the liquid crystal layer 16. The wavelength plate 13 is arranged so as to convert circularly-polarized light emitted from the circularly polarizing light source 12 into linearly-polarized light to transmit the absorption-type linear polarizer 14.

Circularly-polarized light emitted from the circularly polarizing light source 12 is converted into linearly-polarized light for transmitting the absorption-type linear polarizer 14 by the wavelength plate 13. This linearly-polarized light is hardly absorbed and transmits the absorption-type linear polarizer 14 to be incident on the liquid crystal panel 15. In the liquid crystal panel 15, light having transmitted the liquid crystal layer 16 is reflected at the reflective layer 17 and transmits again the liquid crystal layer 16 and then transmits the absorption-type linear polarizer 14 and the wavelength plate 13 to reach the viewer.

The video image evaluation equipment of the present invention converts circularly-polarized light emitted from the circularly polarizing light source into linearly-polarized light for transmitting the absorption-type linear polarizer with a wavelength plate to cause the linearly-polarized light to be incident on the liquid crystal panel. The video image evaluation equipment of the present invention is capable of displaying brighter video images than conventional ones because the video image evaluation equipment is capable of entering and reflecting light emitted from the circularly polarizing light source on the liquid crystal panel without loss.

[Circularly Polarizing Light Source]

Any light source may be usable for the circularly polarizing light source to be used in the present invention as long as the light source emits circularly-polarized light. Light emitted from the circularly polarizing light source is clockwise circularly-polarized light or counter-clockwise circularly-polarized light, alternatively, both of them. The term "clockwise circularly-polarized light" herein means polarized light in which a trail of the electric field vector rotates in a clockwise direction when observing from a traveling direction of light and the term "counter-clockwise circularly-polarized light" herein means polarized light in which a trail of the electric field vector rotates in a counter-clockwise direction. When light emitted from the circularly polarizing light source includes both clockwise circularly-polarized light and counter-clockwise circularly-polarized light, it is preferable that there is a difference in intensity between the clockwise circularly-polarized light and the counter-clockwise circularly-polarized light.

The circularly polarizing light source may be artificial illumination or daylight illumination applying sunlight. When the circularly polarizing light source is artificial illumination, a lighting apparatus may be a fixed lighting apparatus bonded to the ceiling or wall surfaces indoor or may be a portable lighting apparatus disposed on the table or the floor, such as a stand type-lighting apparatus. Alternatively, the lighting apparatus may be a front light of a front light-style reflective liquid crystal display.

When the circularly polarizing light source is daylight illumination, in the circularly polarizing light source, an optical film mentioned below is disposed on the window of a building, a vehicle, a train or an airplane and the like.

One of embodiments of the circularly polarizing light source is illumination using a circularly polarizing dichroism light-emitting material. Examples of the circularly polarizing dichroism light-emitting material include liquid-crystalline conjugated polymer compounds with a helical structure (for example, JP 2004-107542 A and JP 2004-109707 A) or rare-earth complexes (for example, JP 2005-97240 A) or the like.

In another embodiment of the circularly polarizing light source, an optical film is disposed on general illumination emitting natural light (light whose directions of vibrating surfaces of the electric field vector are randomly distributed) or a window of a building, a vehicle, a train or an airplane and the like.

Figure 2:
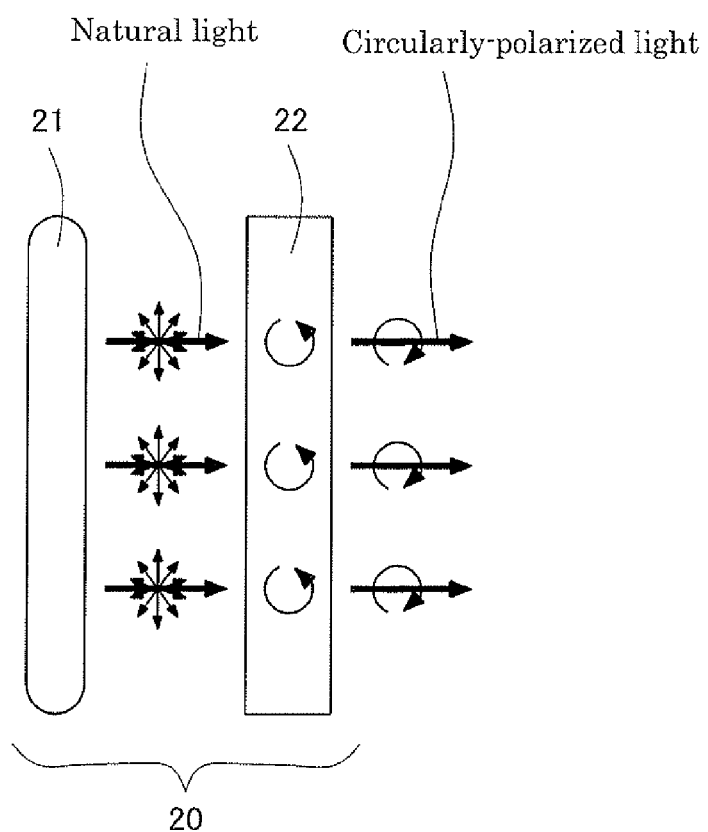
FIG. 2 is a schematic view of a circularly-polarizing light source.

The optical film with a helical structure is not particularly limited, but an optical film, in which a liquid-crystalline compound exhibiting a cholesteric phase is solidified, is preferably used. FIG. 2 is a schematic view of a circularly polarizing light source 20 employing an optical film 22 having a helical structure. Illumination for emitting natural light or natural light emitted from a window 21 is an aggregate of randomly polarized light. Among them, circularly-polarized light facing an opposite direction to a helical direction of the optical film 22 transmits the optical film 22. That is, when the optical film 22 is aligned in a left-handed helical state, clockwise circularly-polarized light transmits the optical film 22. When the optical film 22 is aligned in a right-handed helical state, counter-clockwise circularly-polarized light transmits the optical film 22. Natural light is converted into circularly-polarized light by transmitting the optical film 22.

[Liquid Crystal Display]

The liquid crystal display to be used in the present invention comprises in order from the circularly polarizing light source-side: a wavelength plate having functions to convert circularly-polarized light into linearly-polarized light and vice versa; an absorption-type linear polarizer; and a liquid crystal panel. The aforementioned liquid crystal display may have any other member as long as having the aforementioned members. For instance, an optical compensating film for optically compensating birefringence of the liquid crystal layer may be arranged between the absorption-type linear polarizer and the liquid crystal panel.

[Liquid Crystal Panel]

The liquid crystal panel to be used in the present invention comprises: a liquid crystal layer used as a display medium; and a reflective layer arranged on the opposite side to the viewer-side of the liquid crystal layer. The liquid crystal layer is generally formed by filling low-molecular-liquid crystals in a liquid crystal cell formed of two substrates. Typically, a color filter, an opposite electrode, and an oriented film are provided on one substrate and a liquid crystal driving electrode, a wiring pattern, a thin-film transistor element, and an oriented film are arranged on the other substrate.

The reflective layer is not particularly limited as long as being arranged at the back of the liquid crystal layer (opposite side to the viewer-side). Alternatively the reflective layer may be arranged outside the liquid crystal cell (external reflecting plate) or may be arranged inside the liquid crystal cell. Examples of the reflective layer include an aluminum reflecting plate, a silver reflecting plate, transflective reflecting plate, a reflective polarizer, and an electrode and internal diffusion reflecting plate or the like.

The liquid crystal cell may be reflective-type or semi-reflective-type and transflective-type. The operation of the liquid crystal cell is not particularly limited, but may be a Twisted Nematic mode, an Electrically Controlled Birefringence mode, such as a Vertical Alignment System, Optically Compensated Bend (OCB) System, and In-plane Switching (IPS) System.

[Wavelength Plate]

The wavelength plate to be used in the present invention has functions to convert circularly-polarized light into linearly-polarized light and vice versa. The wavelength plate is typically formed by a polymer film or a coating layer of a liquid-crystalline compound. The wavelength plate may be formed of two or more layers of a laminate wherein a coating layer of the liquid-crystalline compound is laminated on the surface of the polymer film.

Examples of the material for forming the aforementioned polymer film include carbonate-based resins, norbornene-based resins, and cellulose-based resins or the like. A typical example of the coating layer of the aforementioned liquid-crystalline compound is a layer formed by applying a coating liquid containing an ultraviolet curable liquid-crystalline compound on the surface of a base material so that the liquid-crystalline compound may be oriented in one direction and then may be irradiated with ultraviolet rays on the surface of the base material to be cured.

It is preferable that the aforementioned wavelength plate is a quarter wavelength plate or a laminate of a quarter wavelength plate and a half wavelength plate. When the wavelength plate is a laminate of a quarter wavelength plate and a half wavelength plate, the half wavelength plate is arranged between the absorption-type linear polarizer and the quarter wavelength plate. The term "a quarter wavelength plate" herein means a plate whose in-plane phase difference at least one wavelength in a visible light region (at a wavelength of 380 to 780 nm) is a quarter wavelength. Further, the term "a half wavelength plate" herein means a plate whose in-plane phase difference at least one wavelength in the visible light region is a half wavelength. The in-plane phase difference of the quarter wavelength plate at a wavelength of 550 nm is preferably 120 to 160 nm. And the in-plane phase difference of the half wavelength plate at a wavelength of 550 nm is preferably 250 to 290 nm.

A refractive index ellipsoidal body of the aforementioned wavelength plate preferably satisfies a relationship of $n_x > n_y = n_z$ or $n_x > n_z > n_y$, when $n_x$ is a refractive index of a slow axis direction, $n_y$ is a refractive index of a direction orthogonal to the slow axis (fast axis direction), and $n_z$ is a refractive index of a thickness direction. The equation "$n_y = n_z$" in the present invention is not only that $n_y$ and $n_z$ are completely equal but also include a substantial equivalent one. The expression "substantially equivalent" means that an absolute value of the difference between the in-plane phase difference ($Re = (n_x - n_y) \times d$) at a wavelength of 550 nm and a thickness direction phase difference ($Rth = (n_x - n_z) \times d$) is over 0 nm and less than 10 nm.

Figure 3:
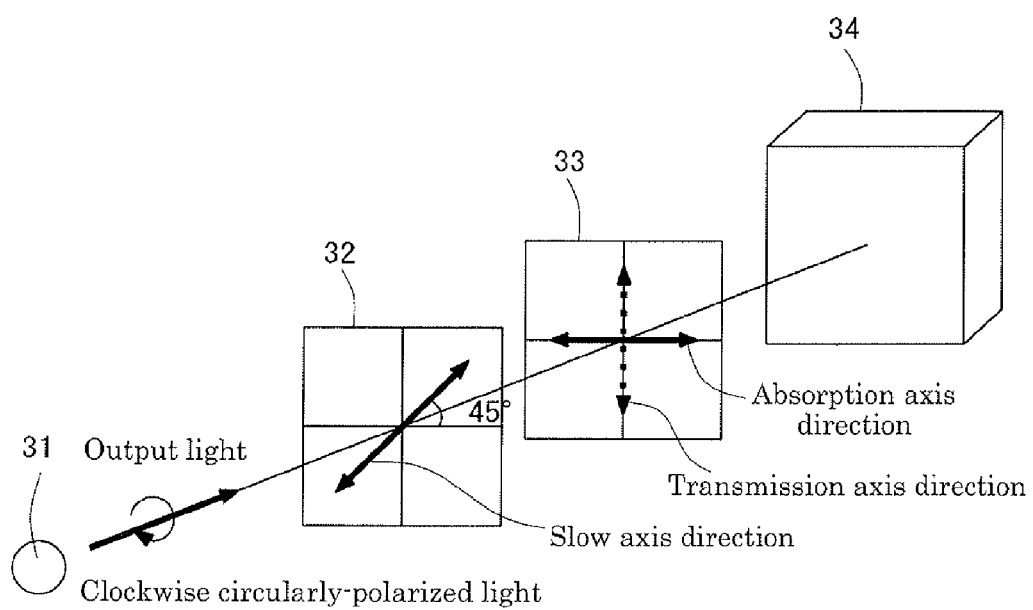
FIG. 3 is a schematic view of the video image evaluation equipment of the present invention.
Figure 4:
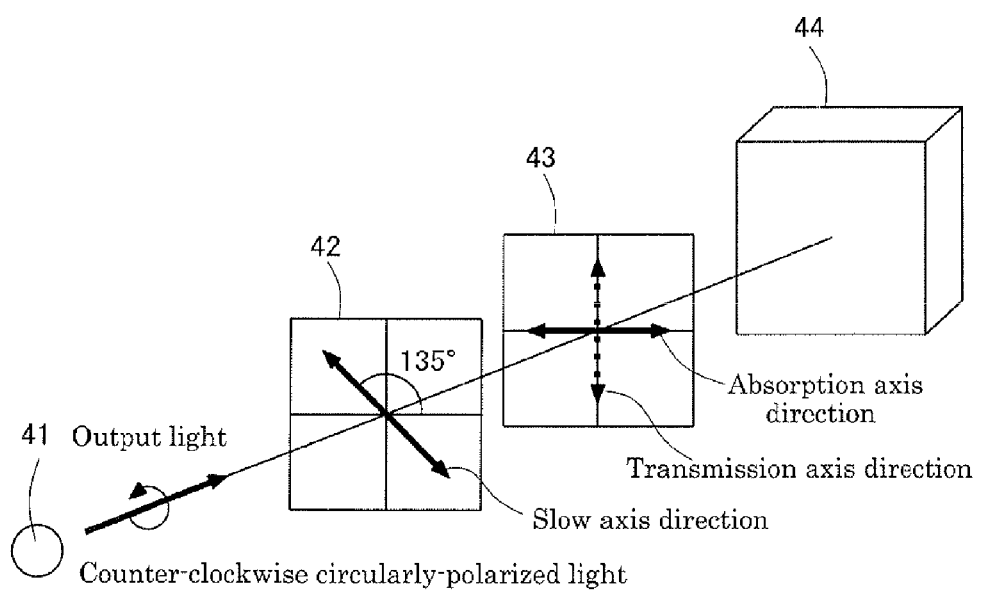
FIG. 4 is a schematic view of the video image evaluation equipment of the present invention.

FIGS. 3 and 4 are schematic views for respectively indicating a relationship between the slow axis direction of a wavelength plate and the absorption axis direction of an absorption-type linear polarizer in one preferred embodiment of the present invention when using one quarter wavelength plate as a wavelength plate. FIG. 3 shows a case of clockwise circularly-polarized light emitted from a circularly polarizing light source and FIG. 4 shows a case of counter-clockwise circularly-polarized light.

In the case where clockwise circularly-polarized light is emitted from a circularly polarizing light source 31 (FIG. 3), when the absorption axis direction of an absorption-type linear polarizer 33 is 0°, the slow axis direction of a wavelength plate 32 is preferably in the range of 45°±5° in counter-clockwise rotation when viewed from the viewer-side. The clockwise circularly-polarized light emitted from the circularly polarizing light source 31 transmits the wavelength plate 32 and then turns into linearly-polarized light located in the transmission axis direction of the absorption-type linear polarizer 33. Accordingly, the clockwise circularly-polarized light reaches a liquid crystal panel 34 without being absorbed into the absorption-type linear polarizer 33.

In the case where counter-clockwise circularly-polarized light is emitted from a circularly polarizing light source 41 (FIG. 4), when the absorption axis direction of an absorption-type linear polarizer 43 is 0°, the angle of a wavelength plate 42 in the slow axis direction is preferably in the range of 135°±5° in counter-clockwise rotation when viewed from the viewer-side. The counter-clockwise circularly-polarized light emitted from the circularly polarizing light source 41 transmits the wavelength plate 42 and then turns into linearly-polarized light located in the transmission axis direction of the absorption-type linear polarizer 43. Accordingly, the counter-clockwise circularly-polarized light reaches a liquid crystal panel 44 without being absorbed into the absorption-type linear polarizer 43.

[Absorption-Type Linear Polarizer]

The absorption-type linear polarizer to be used in the present invention is a polarizer for transmitting one polarization component and absorbing the other polarization component when breaking incident light into two polarization components. The absorption-type linear polarizer is not particularly limited, but typically, an absorption-type linear polarizer made by extending a polyvinyl alcohol film and dyeing with iodine may be used. Alternatively, an absorption-type linear polarizing plate available in the market (the absorption-type linear polarizer is sandwiched by transparent protective films) may be used in the present invention.

[Applications]

The video image evaluation equipment of the present invention is suitable for appreciating video images of a liquid crystal display in a bright environment of natural illumination or artificial illumination. The contrast of a liquid crystal display using backlight is usually deteriorated under such an environment due to external light, resulting in extreme poor visibility.

On the other hand, conventional reflective-type liquid crystal displays display video images in a dark state compared to the brightness of illumination. However, the video image evaluation equipment of the present invention has a user-friendly display.

EXAMPLES

Example

Figure 5:
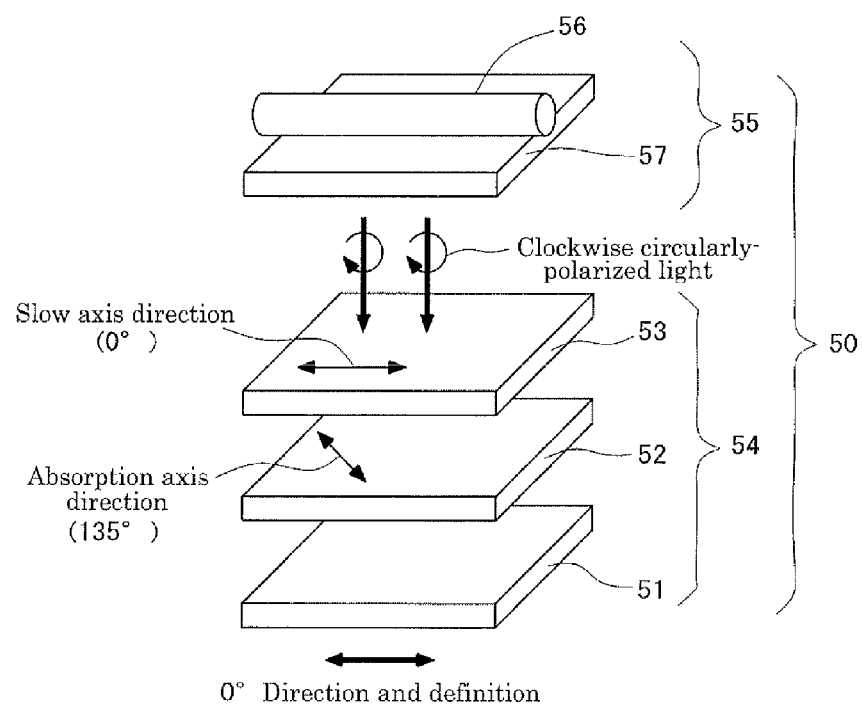
FIG. 5 is a schematic view of the video image evaluation equipment of an embodiment of the present invention.
Figure 6:
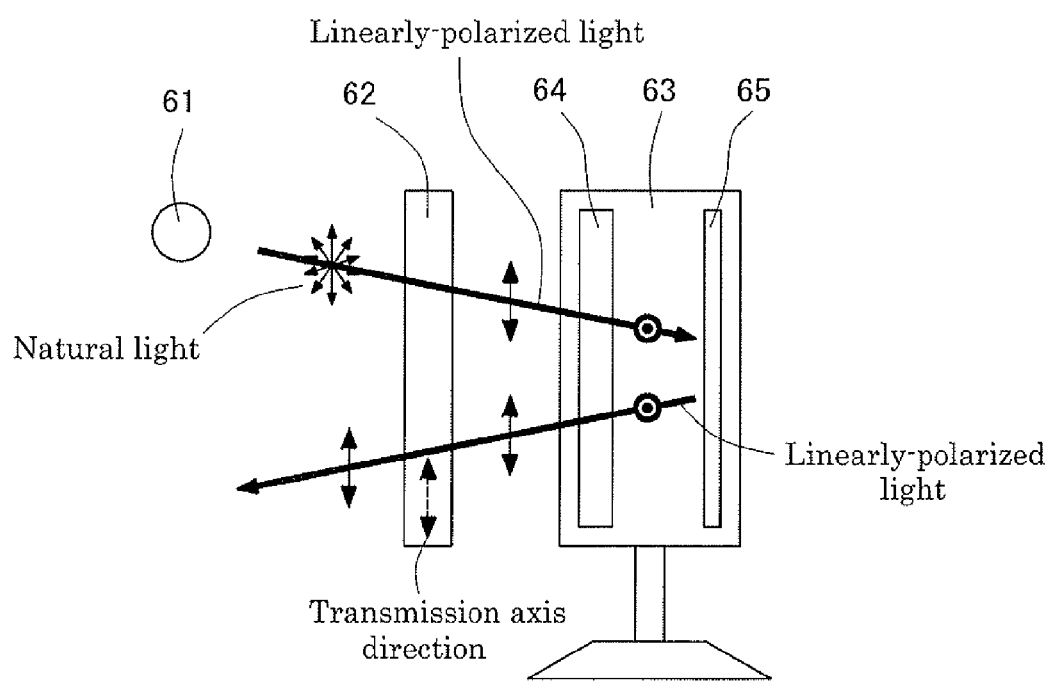
FIG. 6 is a schematic view of a conventional liquid crystal display.

Referring to FIG. 5, examples will now be described. A liquid crystal display 54 was manufactured by adhering a polarizing plate having an absorption-type linear polarizer (manufactured by Nitto Denko Corporation; product name: "NPFSEG1224DU") and a quarter wavelength plate 53 (manufactured by Nitto Denko Corporation; product name: "NZF") to the surface of a liquid crystal panel 51 of a liquid crystal display having a reflective-type TN mode liquid crystal cell (manufactured by Sony Corporation; product name: "VAIO PCG-C2GPS").

A circularly polarizing light source 55 emitting clockwise circularly-polarized light was arranged in a position 60 cm away from the viewer-side from the liquid crystal display 54 to make a video image evaluation equipment 50 as shown in FIG. 5.

A fluorescent lamp 56 for a desk lamp available in the market (Love eye Inverter manufactured by Panasonic Electric Works Co., Ltd.) to which an optical film 57 (manufactured by Nitto Denko Corporation; product name: "PCF400") in which a liquid-crystalline compound exhibiting a cholesteric phase was solidified, was bonded to was used as a circularly polarizing light source 55.

An angle formed by the slow axis direction of the quarter wavelength plate 53 in the aforementioned video image evaluation equipment 50 and the absorption axis direction of the absorption-type linear polarizer 52 is 45° (same as the configuration in FIG. 3: corresponds to the slow axis when rotating the absorption axis by 45° counter-clockwise).

Table 1 shows a measuring result obtained by displaying white images on a liquid crystal display of the video image evaluation equipment in Example.

Comparative Example 1

A video image evaluation equipment was produced in the same manner as Example except that an angle formed by the slow axis direction of a quarter wavelength plate and an absorption-type linear polarizer was 135° (The video image evaluation equipment was so configured that output light was clockwise circularly-polarized light in FIG. 4). In this configuration, the clockwise circularly-polarized light emitted from the circularly polarizing light source was converted into linearly-polarized light by a wavelength plate. However, the clockwise circularly-polarized light hardly transmits the absorption-type linear polarizer because its vibrating surface corresponded with an absorption axis direction of the absorption-type linear polarizer. Accordingly, polarized light hardly reached the liquid crystal panel. White images were displayed on a liquid crystal display of the video image evaluation equipment in Comparative Example 1 to show measured results of brightness in Table 1.

Comparative Example 2

A video image evaluation equipment was produced in the same manner as Example except that a quarter wavelength plate was not used (In FIG. 3, the video image evaluation equipment was configured so as to omit a quarter wavelength plate 32). White images were displayed on a liquid crystal display of the video image evaluation equipment in Comparative Example 2 to show measured results of brightness in Table 1.

TABLE 1

|  | Brightness (cd/m$^2$) |
| --- | --- |
| Example | 102.9 |
| Comparative Example 1 | 18.3 |
| Comparative Example 2 | 65.3 |

[Evaluation]

In Example, clockwise circularly-polarized light emitted from a circularly polarizing light source was converted into linearly-polarized light for transmitting the absorption-type linear polarizer by a wavelength plate to be incident on the liquid crystal panel. Since it was possible to enter and reflect light of the circularly polarizing light source on the liquid crystal panel without loss, resulting in high brightness.

In Comparative Example 1, clockwise circularly-polarized light emitted from a circularly-polarizing light source was converted into linearly-polarized light absorbed into an absorption-type linear polarizer by a wavelength plate. Accordingly, light was hardly incident on the liquid crystal panel having transmitted the absorption-type linear polarizer, its brightness was very low (0.18 time as high as Example). When reversing right to left of the circularly-polarized light emitted from the circularly polarizing light source in Comparative Example 1, it was demonstrated that effects opposite to the present invention were obtained.

In Comparative Example 2, clockwise circularly-polarized light emitted from the circularly polarizing light source was allowed to be incident on an absorption-type linear polarizer. Since about a half of clockwise circularly-polarized light transmitted the absorption-type linear polarizer, brightness of light reflected in a liquid crystal panel was 0.63 time as high as that of Example.

[Measuring Method]
[Measurement of White Brightness]

White images were displayed on the display screen to measure brightness under the conditions that the viewing angle was 1° using a luminance meter (manufactured by TOPCON CORPORATION; product name: "BM-5A").

What is claimed is:

1. A video image evaluation equipment comprising:
   a liquid crystal display; and
   a circularly polarizing light source arranged outside the liquid crystal display,
   wherein the liquid display comprises in order from the circularly polarizing light source-side:
   a wavelength plate having functions to convert circularly-polarized light into linearly-polarized light and vice versa; an absorption-type linear polarizer; and a liquid crystal panel,
   wherein the liquid crystal panel comprises: a liquid crystal layer used as a display medium; and a reflective layer arranged on the opposite side to a viewer-side of the liquid crystal layer,
   wherein the wavelength plate is so arranged that the linearly-polarized light transmits the absorption-type linear polarizer.

2. The video image evaluation equipment according to claim 1, wherein the wavelength plate is a quarter wavelength plate.

3. The video image evaluation equipment according to claim 1 or claim 2, wherein an optical film having a helical structure is arranged on a lighting apparatus for emitting natural light or a window for passing natural light in the circularly polarizing light source.

4. The video image evaluation equipment according to claim 3, wherein the optical film having a helical structure is an optical film in which a liquid-crystalline compound exhibiting a cholesteric phase is solidified.

* * * * *